United States Patent
Steinhilber

(10) Patent No.: US 6,885,515 B2
(45) Date of Patent: Apr. 26, 2005

(54) LIBRARY FOR DATA STORAGE TAPE CARTRIDGES

(75) Inventor: Friedhelm Steinhilber, Rottweil (DE)

(73) Assignee: Patentia Hergiswil AG, Hergiswil (CH)

( * ) Notice: Subject to any disclaimer, the term of this patent is extended or adjusted under 35 U.S.C. 154(b) by 343 days.

(21) Appl. No.: 10/005,343

(22) Filed: Nov. 8, 2001

(65) Prior Publication Data

US 2002/0118482 A1 Aug. 29, 2002

Related U.S. Application Data

(60) Provisional application No. 60/247,205, filed on Nov. 9, 2000, provisional application No. 60/247,204, filed on Nov. 9, 2000, and provisional application No. 60/247,153, filed on Nov. 9, 2000.

(30) Foreign Application Priority Data

Nov. 9, 2000 (DE) .......................................... 100 55 624

(51) Int. Cl.[7] .............................................. G11B 15/18
(52) U.S. Cl. ...................................................... 360/69
(58) Field of Search ..................... 360/69, 92; 294/116; 414/753, 741, 280; 369/36, 34; 242/337, 337.1

(56) References Cited

U.S. PATENT DOCUMENTS

| | | | | |
|---|---|---|---|---|
| 3,512,785 A | * | 5/1970 | Ban ........................ | 360/78.03 |
| 3,774,916 A | * | 11/1973 | Nanba ........................ | 360/92 |
| 3,872,506 A | * | 3/1975 | Staar ........................... | 360/92 |
| 3,889,169 A | * | 6/1975 | Hirschman et al. ......... | 318/571 |
| 4,063,294 A | | 12/1977 | Burkhart ...................... | 360/92 |
| 5,021,901 A | * | 6/1991 | Mondocea et al. ........... | 360/92 |
| 5,236,258 A | | 8/1993 | Bunch ....................... | 312/9.31 |
| 5,449,091 A | * | 9/1995 | Dalziel ........................ | 221/81 |
| 5,469,310 A | | 11/1995 | Slocum et al. ................ | 360/92 |
| 5,588,796 A | | 12/1996 | Ricco et al. ................. | 414/741 |
| 5,640,288 A | * | 6/1997 | Horie ...................... | 360/98.04 |
| 5,682,276 A | * | 10/1997 | Hinnen et al. ................ | 360/92 |
| 5,847,897 A | * | 12/1998 | Marlowe ..................... | 360/92 |
| 6,130,800 A | * | 10/2000 | Ostwald ...................... | 360/92 |
| 6,560,061 B2 | * | 5/2003 | Helmick et al. .............. | 360/92 |

FOREIGN PATENT DOCUMENTS

| | | | | |
|---|---|---|---|---|
| EP | 1045382 A2 | 10/2000 | .......... | G11B/15/68 |
| JP | 05225666 A | 3/1993 | .......... | G11B/15/68 |

* cited by examiner

*Primary Examiner*—Sinh Tran
*Assistant Examiner*—K. Wong
(74) *Attorney, Agent, or Firm*—Baker Botts L.L.P.

(57) ABSTRACT

A library for cartridges of a data storage tape comprises a drive with a cartridge pocket and a magazine revolving about the drive with a plurality of receivers for the cartridges. The receivers are positionable in front of a cartridge pocket in order to change a cartridge between the receiver and the cartridge pocket. Cartridges can be inserted or removed through a port of the housing of the library into the receiver of the magazine. The cartridge pocket, a receiver positioned in front of the cartridge pocket, and the port of the housing may be linearly aligned such that cartridges can also be inserted through the port directly into the cartridge pocket or can be removed directly from the cartridge pocket through the port.

10 Claims, 8 Drawing Sheets

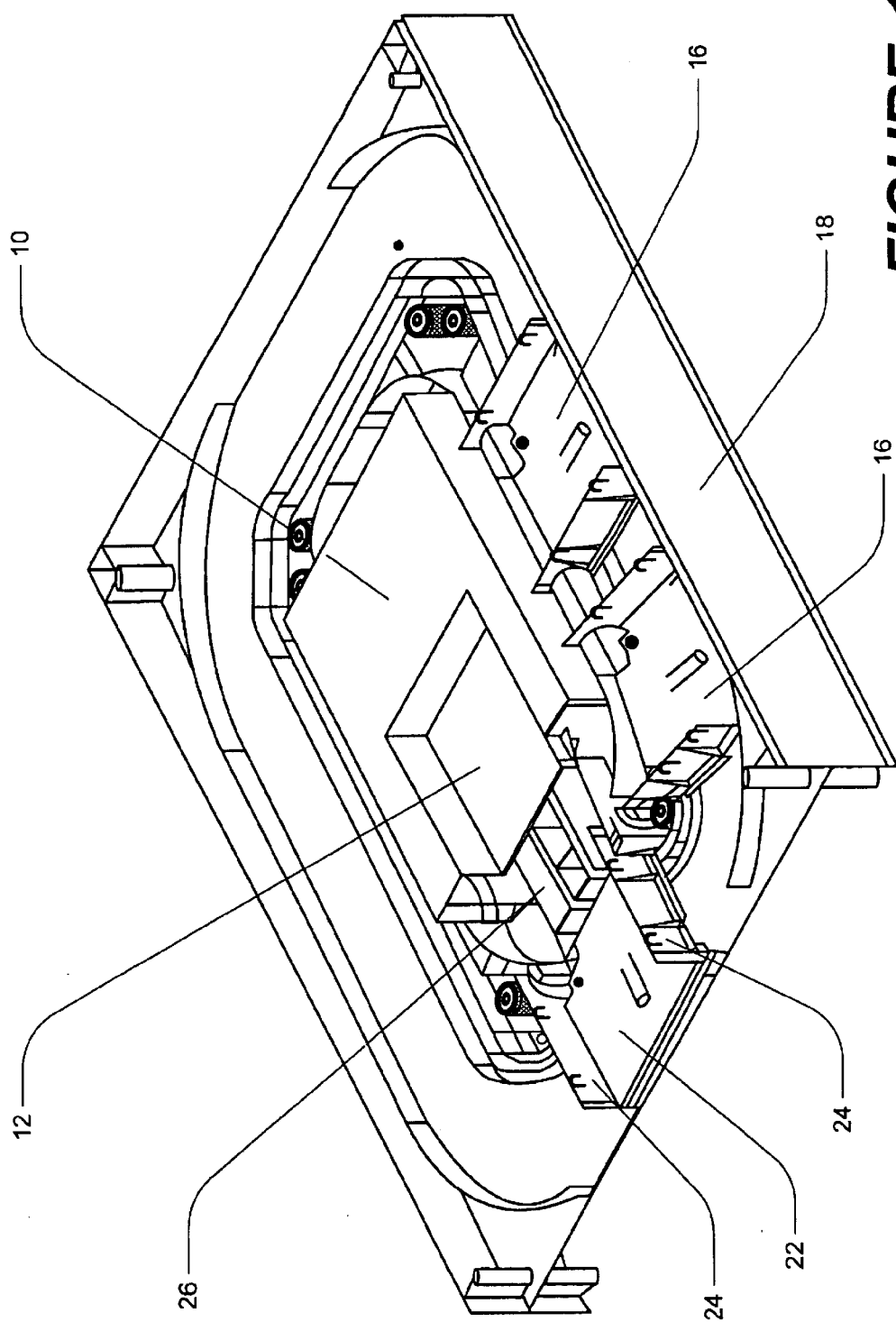

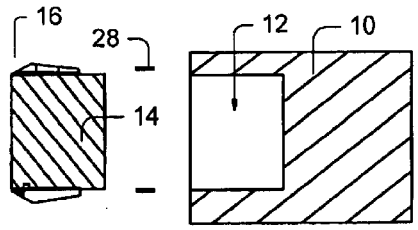
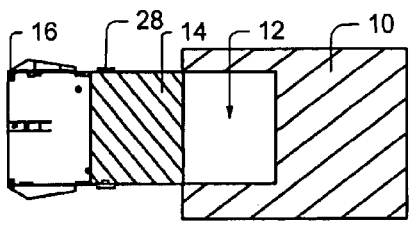
Fig. 5a / Fig. 5g
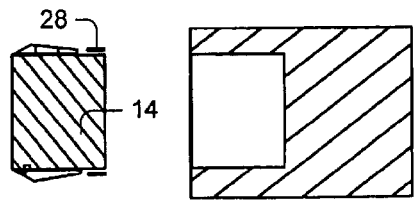
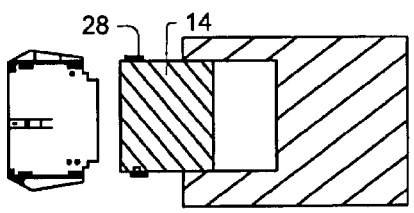
Fig. 5b / Fig. 5h
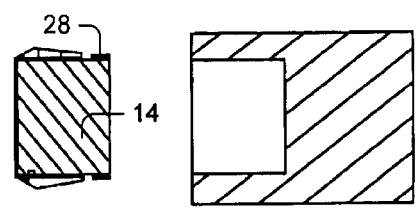
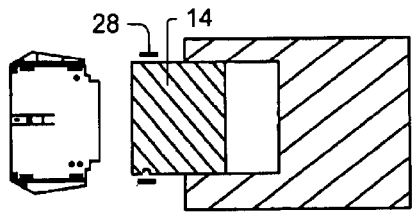
Fig. 5c / Fig. 5i
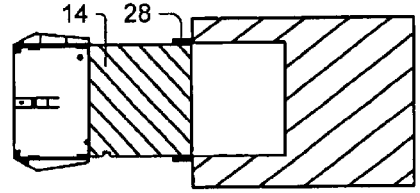
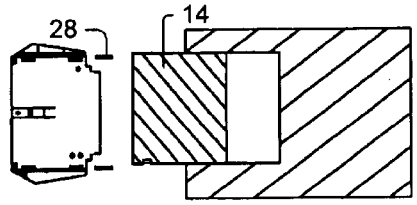
Fig. 5d / Fig. 5j
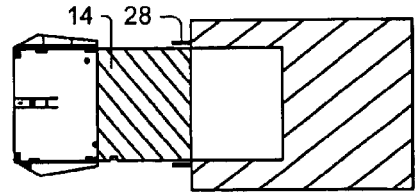
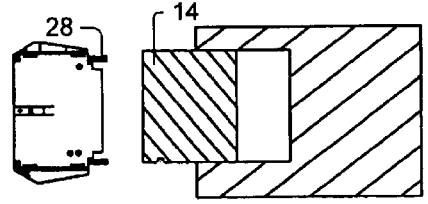
Fig. 5e / Fig. 5k
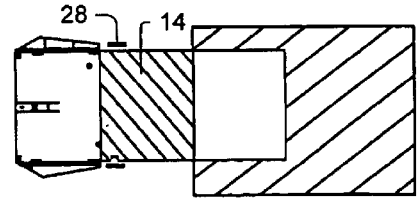
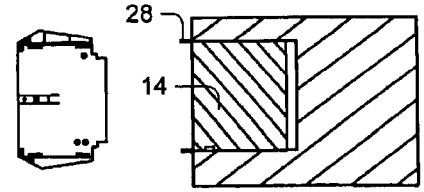
Fig. 5f / Fig. 5l

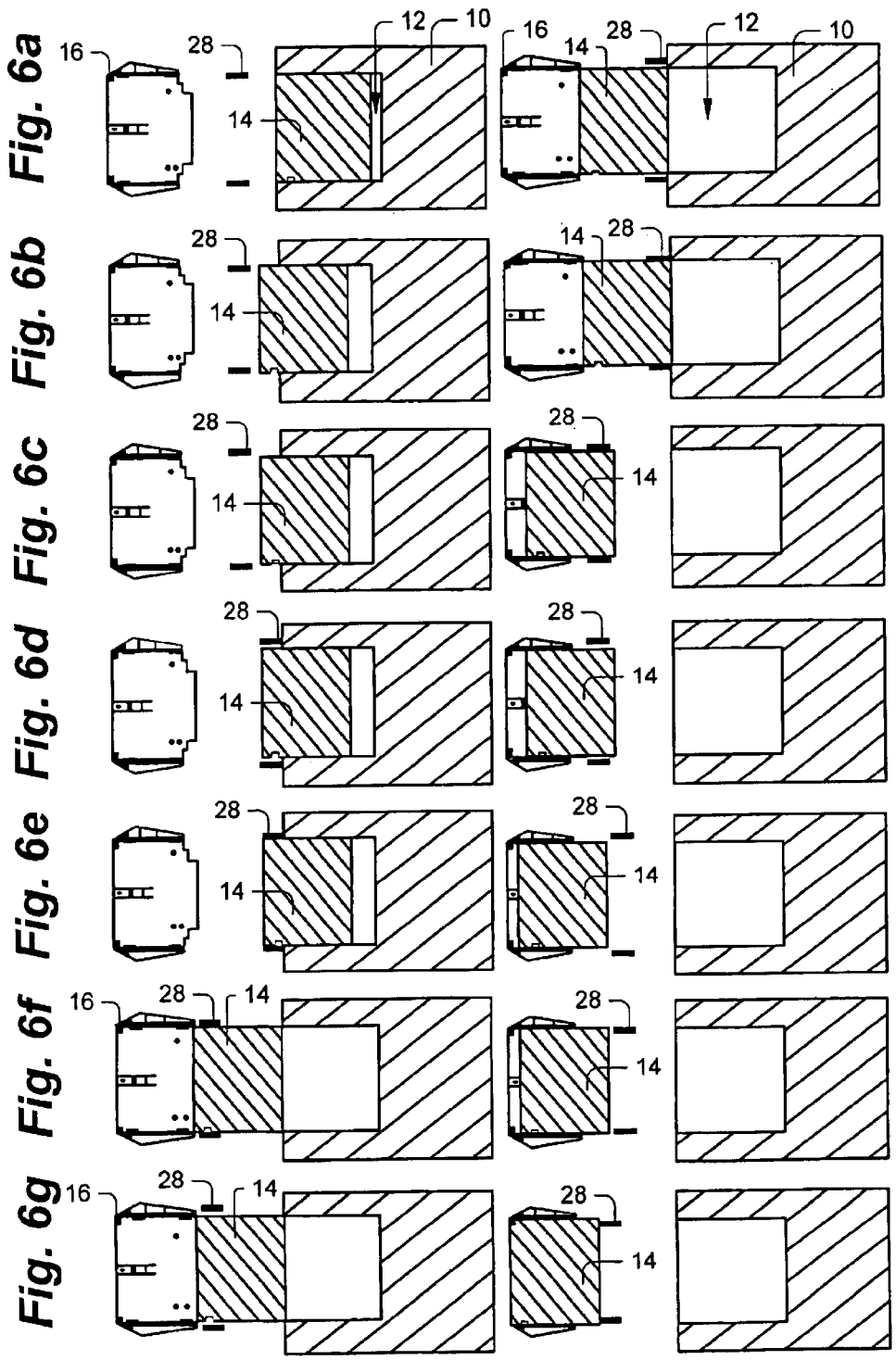

LIBRARY FOR DATA STORAGE TAPE CARTRIDGES

RELATED APPLICATIONS

The following applications are related to the present invention and are hereby incorporated by reference in their entirety:
1. U.S. patent application Ser. No. 09/709,852, titled "COMPACT COMBINATION CASSETTE LOADER AND TAPE DRIVE AND METHOD OF USING SAME," filed Nov. 9, 2000.
2. U.S. Provisional Patent Application Ser. No. 60/247,205, titled "BAR CODE SCANNER," filed Nov. 9, 2000.
3. U.S. Provisional Patent Application Ser. No. 60/247,204, titled "AUTO LOADER DRIVE INTERFACE CONTROL," filed Nov. 9, 2000.
4. U.S. Provisional Patent Application Ser. No. 60/247,153, titled "AUTO LOADER COMBINATION," filed Nov. 9, 2000.
5. German Patent Application No. 100 55 626.4, titled "AUTOMATISCHE BIBLIOTHEK FÜR KASSETTEN VON DATENSPEICHERBÄNDERU," filed Nov. 9, 2000.
6. German Patent Application No. 100 55 625.6, titled "AUTOMATISCHE BIBLIOTHEK FÜR KASSETTEN," filed Nov. 9, 2000.
7. German Patent Application No. 100 55 624.8, titled "BIBLIOTHEK FÜR KASSETTEN EINES DATENSPEICHERBANDES," filed Nov. 9, 2000.
8. German Patent Application No. 100 55 541.1, titled "VORRICHTUNG ZUR ÜBERGABE EINER KASSETTE," filed Nov. 9, 2000.
9. U.S. patent application Ser. No. 10/005,693, titled "AUTOMATIC LIBRARY FOR DATA STORAGE TAPE CARTRIDGES," filed concurrently herewith.
10. U.S. patent application Ser. No. 10/005,966, titled "AUTOMATIC LIBRARY FOR DATA STORAGE TAPE CARTRIDGES," filed concurrently herewith.
11. U.S. patent application Ser. No. 10/005,359, titled "DEVICE FOR TRANSFERRING A CARTRIDGE," filed concurrently herewith.

BACKGROUND OF THE INVENTION

1. Field of the Invention

The invention relates to data storage systems. In particular, the invention relates to libraries for cartridges of data storage tapes.

2. Related Art

For the storage of large quantities of data preferably data storage tapes are used, wherein these are contained in cartridges to permit better handling. For a further increase of the data quantities to be stored are used libraries, in which a multiplicity of cartridges are contained in a magazine and can be changed selectively into one or more tape cartridge drives. Such libraries are also known under the designation "tape library," "tape cartridge library" or "autoloader for tape cartridges." such libraries, such as are known for example from U.S. Pat. No. 5,236,258, a receiver of the magazine can be positioned in front of the cartridge pocket of the drive such that a cartridge can be changed from the receiver of the magazine into the cartridge pocket of the drive, or can be changed from the cartridge pocket into the receiver of the magazine. In order to be able to load the magazine with the cartridges, the housing of the library has a port (mail slot) through which cartridges can be introduced into the magazine or can be removed from the magazine.

The known libraries are in particular suitable for automatic operation, in which via control commands in each instance the desired cartridges can be changed from the magazine into the drive. An exchange of the cartridges contained in the magazine through the port is only rarely carried out.

In the above described species, cartridges cannot readily be introduced independently of the magazine from the outside into the drive and cannot be removed from the drive.

BRIEF DESCRIPTION OF THE DRAWINGS

In the following the invention will be explained in further detail in conjunction with embodiment examples depicted in the drawings, in which:

FIG. 1 is a perspective view of a cartridge magazine with drive according to one embodiment of the invention;

FIGS. 5a–l illustrate the process of loading the cartridge into a drive;

FIGS. 6a–n illustrate the process of removal of a cartridge from a drive; and

DESCRIPTION OF CERTAIN EMBODIMENT OF THE INVENTION

Figure 2A:
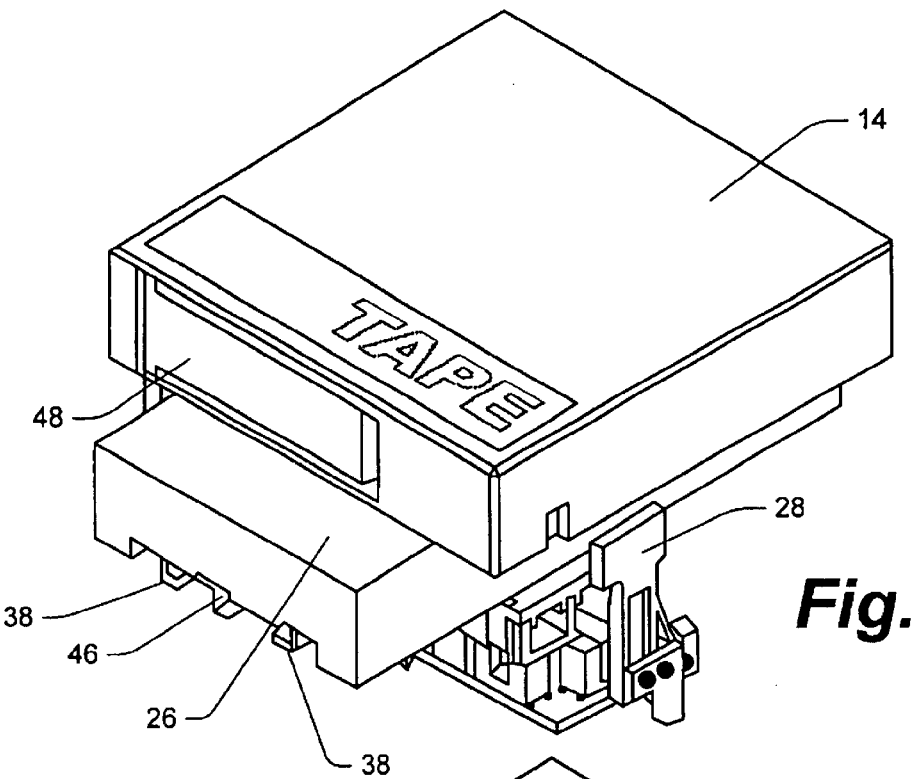
FIG. 2a is an isolated representation of the guidance with a cartridge and the gripper system in the open position.

One embodiment of the invention comprises disposing a port of a housing, a cartridge pocket and a receiver of a magazine, positioned before the cartridge pocket of the drive such that they are aligned with respect to one another. A cartridge can be transported from the outside through the port and the positioned receiver in a straight line directly into the cartridge pocket, or a cartridge can be transported from the cartridge pocket directly in a straight line via the receiver through the port. In this way it is possible to introduce cartridges into the drive or to remove them from the drive in the same way as is the case in a simple drive which is not equipped with a magazine.

In another embodiment of the invention, a drive is disposed with a horizontally-placed cartridge pocket. A magazine revolves on a closed path of revolution about the drive. Receivers of the magazine are disposed such that cartridges in the receivers also lie flat in the plane of revolution of the magazine. This yields a space-saving low overall height of the library.

In another embodiment of the invention, the cartridges are disposed in the magazine standing on end. A corresponding disposition of the drive is provided with the cartridge pocket disposed such that it stands on end. While a greater overall height of the library is obtained, advantageously also more than one drive can be disposed within the revolving magazine.

In one embodiment, the library is equipped with a gripper system which transports the cartridges between the port and the cartridge pocket. Since this transport path is continuous in substantially a straight line, a single gripper system with simple structure may be used for the automatic changing of the cartridges between the magazine and the drive and also for the direct introduction and removal of the cartridges from the outside.

FIG. 1 shows a library for data storage tape cartridges, or a tape cartridge library. The library comprises a drive 10 for the cartridges with a cartridge pocket 12. The drive 10 is disposed lying flat. A multiplicity of cartridges 14 can be contained in one magazine, which moves the cartridges 14 in a closed path of revolution about the drive 10. In this magazine, the cartridges 14 are also disposed lying flat in the same plane in which the drive 10 with its cartridge pocket 12 is located. In the magazine, the cartridges 14 are disposed in carriers 16 which are positionably moved under driving on the path of revolution.

The cartridge pocket 12 of the drive 10 is directed toward the front side of a housing 18 of the library. In FIG. 1, the front panel of the housing 18 has been omitted for the sake of clarity. In this front panel, a port 20 (shown in FIG. 4) is located for introducing and removing the cartridge 14 into/from the magazine.

Figure 4:
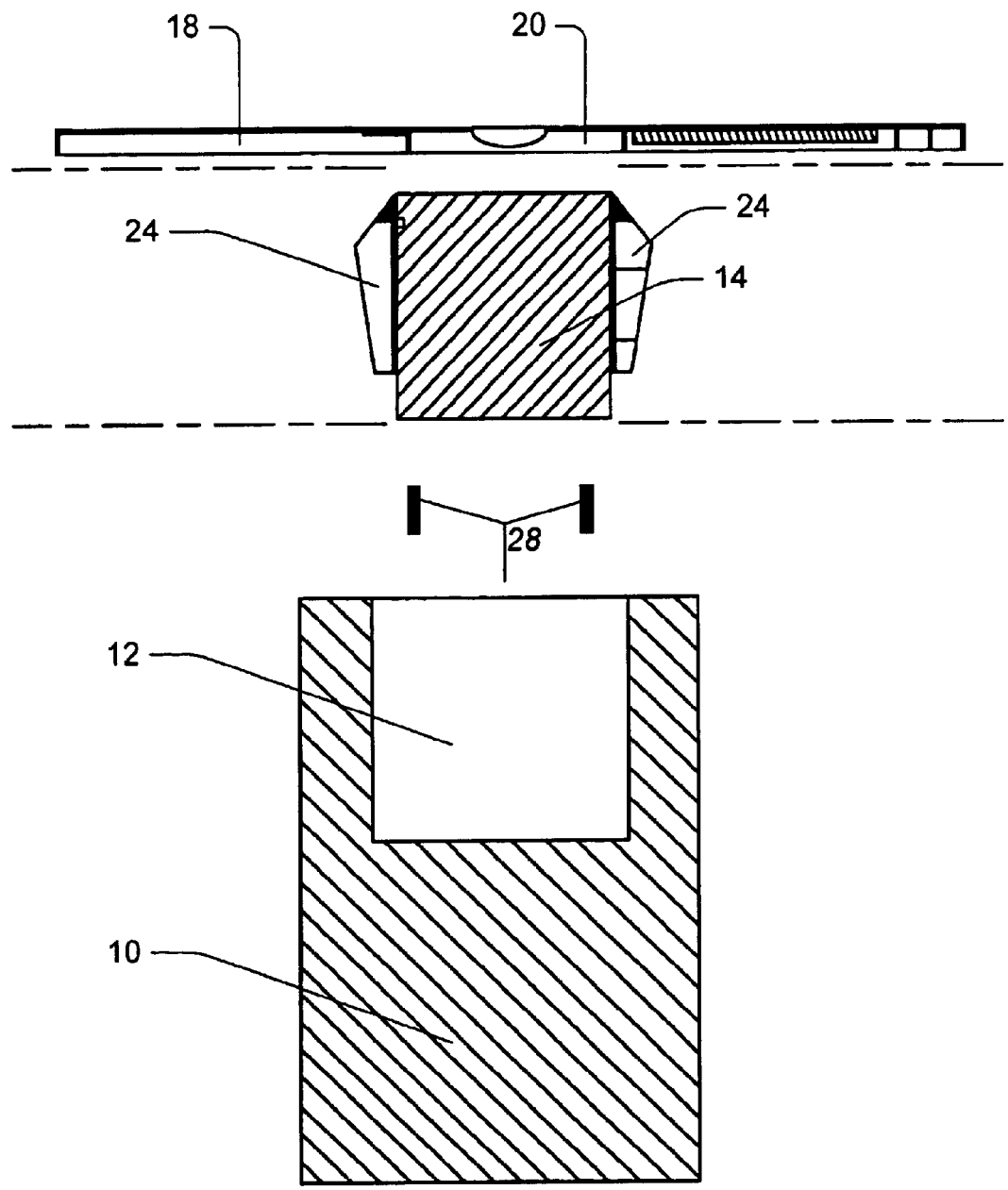
FIG. 4 illustrates the transfer device in top view shown schematically.

The carriers 16 may be positioned via the drive of the magazine in front of the drive 10 in such a way that the carriers 16 are aligned with the cartridge pocket 12 on the one hand, and with the port 20 in the front side of housing 18 on the other. This position is shown in FIG. 4.

Referring again to FIG. 1, the carriers 16 may comprise a bottom 22 and two substantially parallel lateral guidance walls 24. The cartridges 14 rest in contact with the bottom 22 of the carrier 16 and are held and guided laterally by the guidance walls 24 such that, in the direction of revolution of the magazine, they assume a definite position in the carrier 16 and are displaceable in the carrier 16 in a radial direction of the path of revolution. A latching (not shown) for engaging the cartridge 14 may be provided on the guidance walls 24. The latching may secure the cartridges 14 in the carriers 16 against inadvertent displacement in the radial direction.

In front of the cartridge pocket 12 are disposed slide rails 26 extending in a slide-in direction of the cartridge pocket 12. The slide rails 26 bridge the interval between the entrance slot of the cartridge pocket 12 and the bottom 22 of the carrier 16 positioned in front of the cartridge pocket 12. Beneath the slide rails 26 may be disposed a gripper system which is more clearly illustrated in FIGS. 3a and 3b.

The gripper system may reach with grippers 28 on both sides of the slide rails 26 upwardly in order to grasp the cartridges 14 and to transport them in a manner to be described later. The gripper system can remove a cartridge 14 from a carrier 16 positioned in front of the drive 10 and slide it into the cartridge pocket 12 of the drive. The gripper system can also pull a cartridge 14 from the cartridge pocket 12 of the drive 10 and deposit it into an empty carrier 16 of the magazine positioned in front of the cartridge pocket 12. Thus, with the aid of the gripper system, a cartridge change between the magazine and the drive is feasible. The gripper system can also eject a cartridge 14 from the carrier 16 positioned in front of the cartridge pocket 12 through the port 20 to the outside. Conversely, through the port 20, the carrier 16 positioned between the port 20 and the drive 10 can also be loaded with a cartridge 14.

Thus, broad versatility of the library is achieved with a constructionally simple structure. With the same gripper system the cartridge change between the magazine and the drive and the ejection of the cartridges from the magazine may be effected. Since the port 20, the carrier 16 and the cartridge pocket 12 are disposed radially aligned in this position, it is also possible to introduce a cartridge 14 through the port 20 and the empty carrier 16 directly into the drive 10 or to eject a cartridge 14 from the cartridge pocket 12 directly via the carrier 16 through the port 20. In this way, the library with the magazine idle can also be used in the same way as a simple drive without a magazine.

Figure 3A:
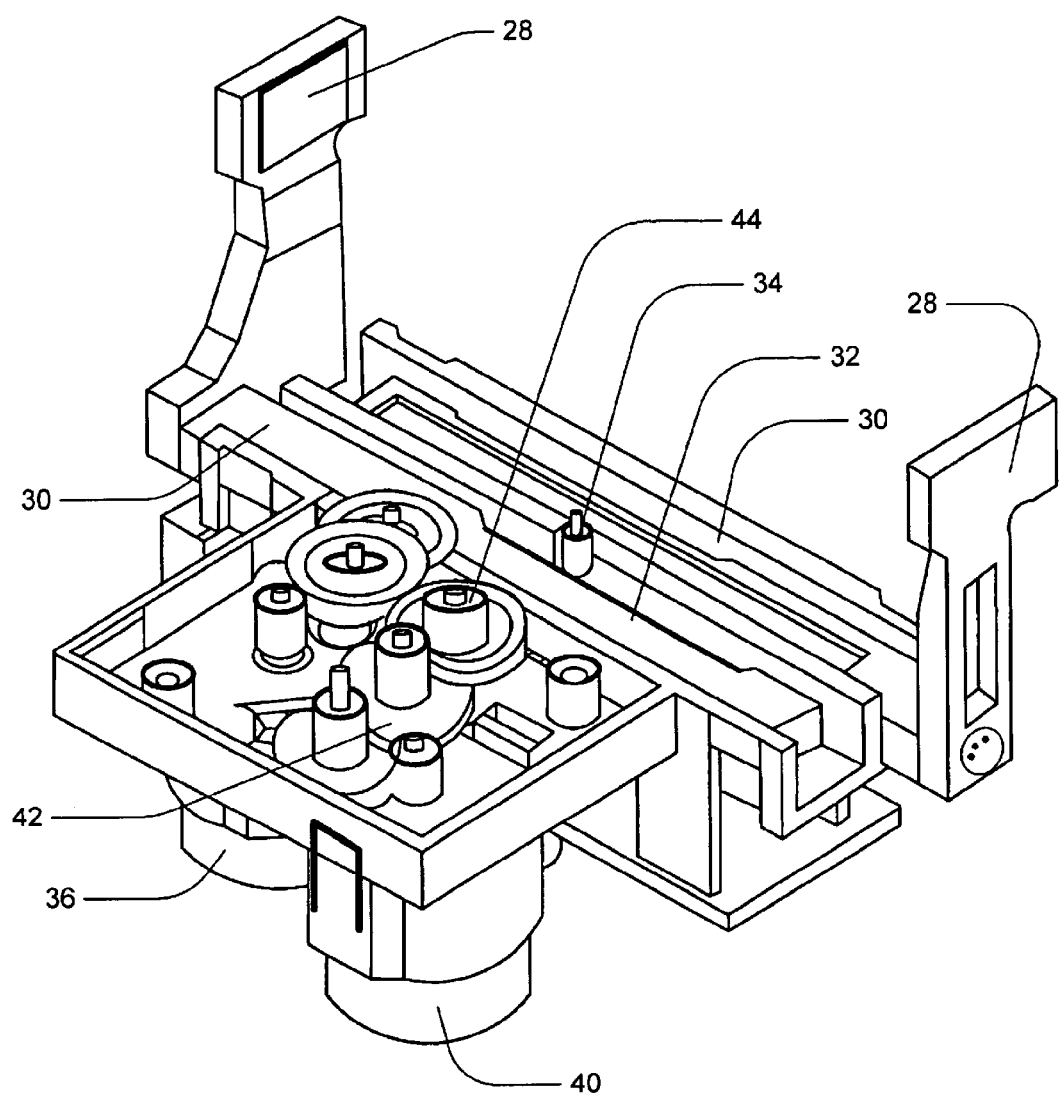
FIG. 3a is a representation with the gripper system in the closed position.
Figure 3B:
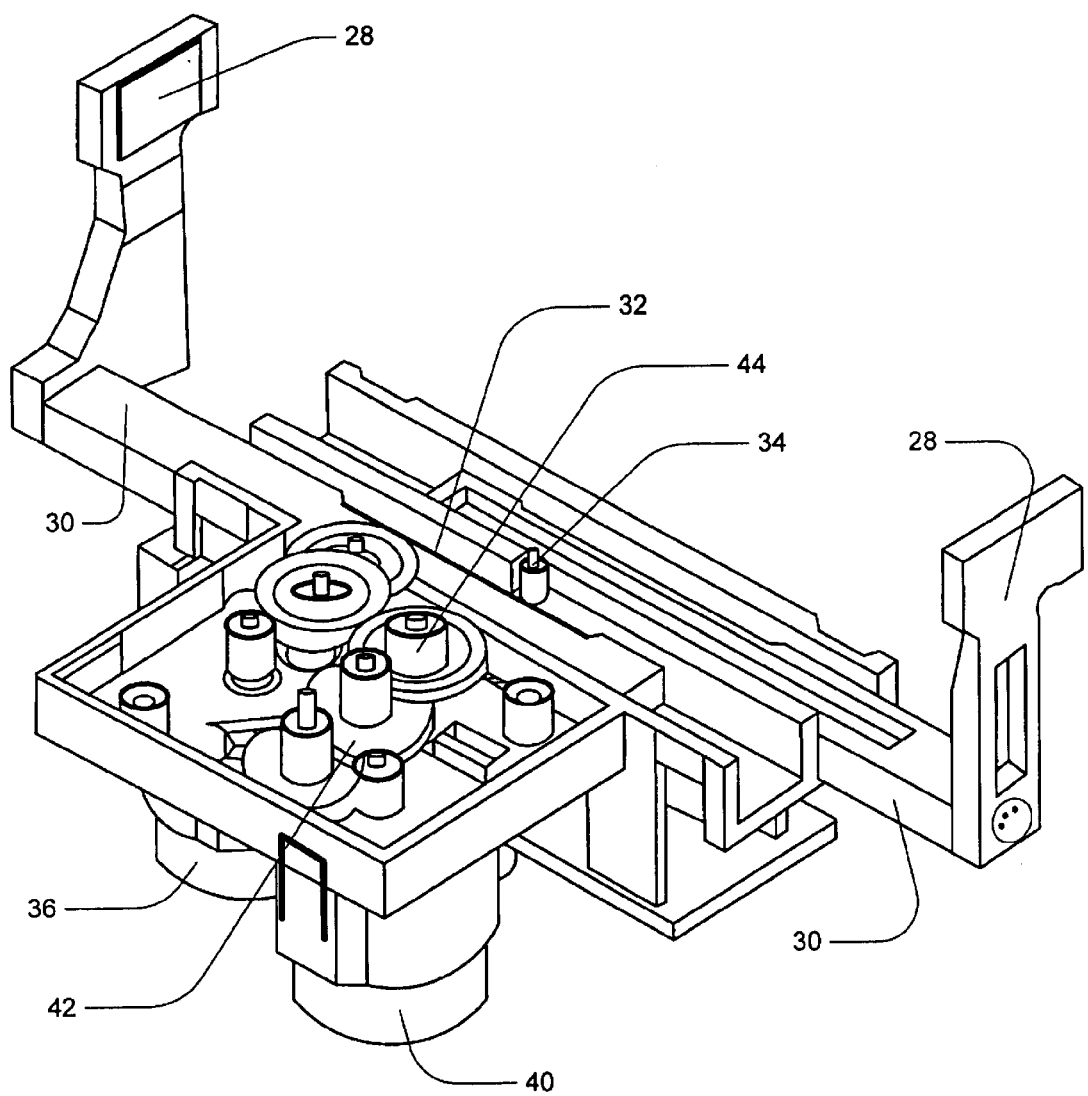
FIG. 3b is a representation with the gripper system in the open position.

The gripper system, represented in detail in FIGS. 3a and 3b, may comprise two grippers 28, which extend upwardly on each side adjacent to the slide rails 26 (not shown in FIGS. 3a and 3b). The grippers 28 are each disposed on one end of a sliding bar 30. Each sliding bar 30 may be displaceably guided under the slide rail 26 horizontally and transversely to the slide rails 26. In one embodiment, the sliding bars 30 comprise toothings 32 facing one another. A common pinion gear 34 engages each set of toothings 32. The pinion gear 34 may be controlled by an electric motor 36 via a gearing, for example. Depending on the direction of driving of the pinion gear 34, the sliding bars 30 are moved either toward one another in a closing movement or apart from one another in an opening movement.

The entire gripper system is movable in the longitudinal direction of the slide rails 26. For this purpose the gripper system is supported in guidances 38 which extend on the underside of the slide rails 26 in their longitudinal direction. The driving for the movement of the gripper system along the slide rails 26 may be supplied by a further electric motor 40 of the gripper system. The electric motor 40 may engage a second driving pinion 44 via a gearing 42 and a toothed rack 46 extending on the underside of the slide rails 26 in their longitudinal direction.

The operational function of the gripper system and the process flow of the transfer of the cartridges will be explained schematically in the following in conjunction with FIGS. 5 to 7.

FIGS. 5a–l show the process flow involved in sliding a cartridge 14 into the cartridge pocket 12. The steps are illustrated sequentially in the figures.

Referring first to FIG. 5a, the carrier 16 with the selected cartridge 14 is initially positioned under control in front of the cartridge pocket 12 by the drive of the magazine. The gripper system is in its starting position with opened grippers 28 between the drive 10 and the carrier 16. As shown in FIG. 5b, the gripper system subsequently moves the grippers 28 toward the carrier 16 with the grippers 28 remaining in the open position until the grippers 28 are located on both sides next to the cartridge 14. The grippers 28 are subsequently moved toward one another into the closed position such that they come laterally into contact with the cartridge 14 and clamp and retain it, as illustrated in FIG. 5c.

The gripper system now moves the grippers 28 closed toward the drive 10, until the grippers 28, with the front side of the cartridge 14, reach the cartridge pocket 12 (FIG. 5d). As illustrated in FIG. 5e, the grippers 28 are now again moved into the open position such that they release the cartridge 14, and the cartridge 14 comes to rest on the slide rails 26 (not shown in FIGS. 5a–l). The gripper system subsequently moves the open grippers 28 again toward the carrier 16 (FIG. 5f).

Figure 2B:
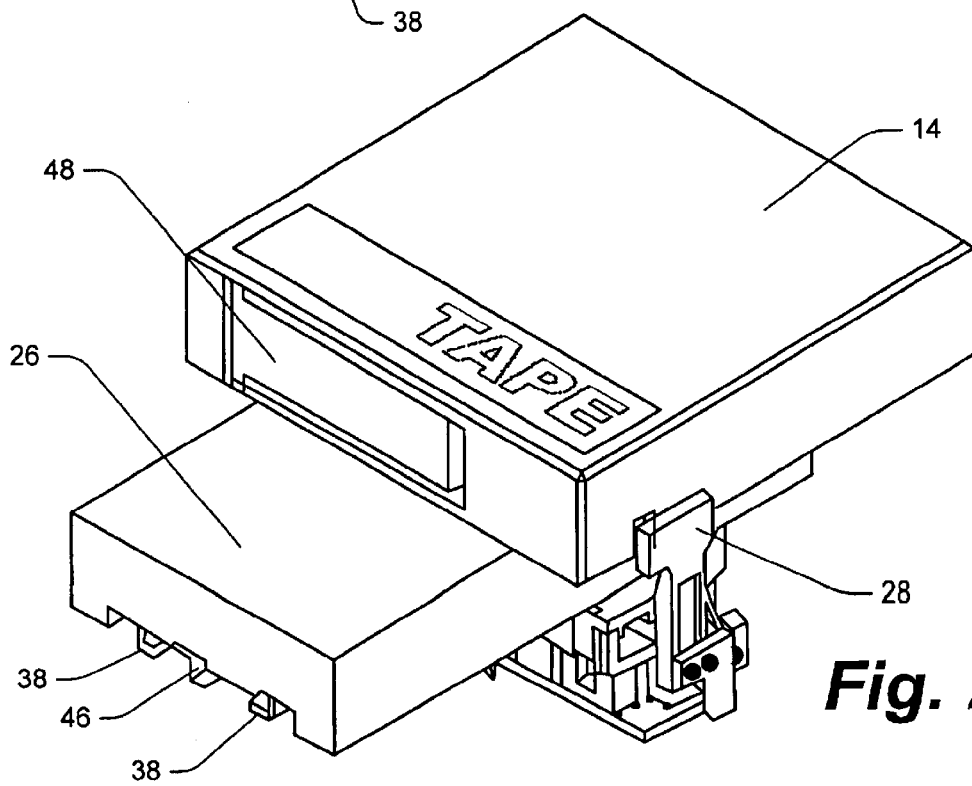
FIG. 2b is a representation corresponding to FIG. 2a with the gripper system in the closed position.

Now referring to FIG. 5g, once the grippers 28 reach the carrier 16 again, the grippers 28 are moved again into the closed position and grasp the cartridge 14 now near its rear end. The gripper system now again moves the closed grippers 28 toward the drive 10, whereby the cartridge 14 is slid into the cartridge pocket 12 (FIG. 5h). In this position, the cartridge may be located at a position in which the cartridge 14 is moved against a stop of the cartridge pocket 12 by which the flap 48 (shown in FIGS. 2a–b) of the cartridge 14 may be opened.

In FIG. 5i, the grippers 28 are now moved apart again and, in FIG. 5j, moved toward the carrier 16 beyond the rear edge of the cartridge 14. The grippers 28 are now moved again toward one another into the closed position (FIG. 5k). Since the grippers 28 are located behind the cartridge 14, they can be moved closer together to a mutual spacing which is less than the width of the cartridge 14. Subsequently, as illustrated in FIG. 5l, the grippers 28 may be again moved toward the drive 10 with the grippers 28 now engaging the backside of the cartridge 14 and sliding it completely into the cartridge pocket 12. During this last sliding of the cartridge 14 into the cartridge pocket 12, the cartridge 14 may be pressed against the stop of the cartridge pocket 12 which moves the cartridge flap 48 into its open position. Since the grippers 28 herein engage the rear edge of cartridge 14 and, in positive engagement, slide the cartridge 14, the resistance entailed in opening the flap 48 can be overcome by the grippers 28, which would be more difficult in the case of frictional engagement of the grippers 28 on the side edges of the cartridge 14.

In FIGS. 6a–n is shown correspondingly the manner in which the cartridge 14 is removed from the cartridge pocket 12 and transported in the carrier 16. As illustrated in FIG. 6a, the cartridge 14 is initially in the cartridge pocket 12 and the gripper system with the grippers 28 is in its starting position. The cartridge 14 is first ejected from the drive 10 by, for example, an internal drive mechanism (FIG. 6b). In FIG. 6c, the grippers 28 are moved apart, driven toward the drive 10 (FIG. 6d) and subsequently moved into their closed position in order to grasp the rear end of the cartridge 14 projecting from the cartridge pocket 12 of the drive 10 (FIG. 6e).

Subsequently, as illustrated in FIG. 6f, the gripper system moves the closed grippers 28 toward the carrier 16 in order to pull the cartridge 14 from the cartridge pocket 12. When the grippers 28 have reached the carrier 16, the grippers 28 are again moved apart in order to release the cartridge 14 (FIG. 6g), wherein the cartridge 14 again comes to rest on the slide rails 26 (not shown in FIGS. 6a–n). The grippers 28 are then again moved, for the purpose of regrasping the cartridge 14, toward the drive 10 (FIG. 6h) where they again grasp the cartridge, now at its front end (FIG. 6i).

The grippers 28 are then again moved toward the carrier 16 in order to slide the cartridge 14 into the carrier 16 (FIG. 6j). Once the cartridge 14 has arrived at the latching of the guidance wall 24 (see FIG. 4) of the carrier 16, the grippers 28 are opened again (FIG. 6k) and moved back beyond the front edge of cartridge 14 (FIG. 6l). The grippers 28 are then moved together in their closed position beyond the front edge of cartridge 14 (FIG. 6m) such that they can positively engage the front edge of cartridge 14 and, while overcoming the latching force, can press it completely into the latching of the carrier 16 (FIG. 6n).

Figure 7A:
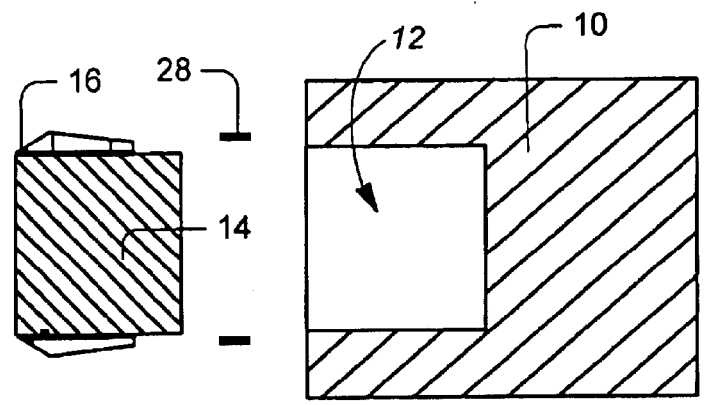
FIGS. 7a–c illustrate the process of ejection of a cartridge.
Figure 7B:
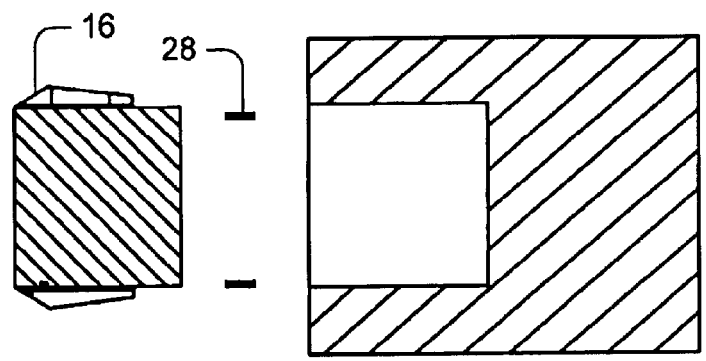
Figure 7C:
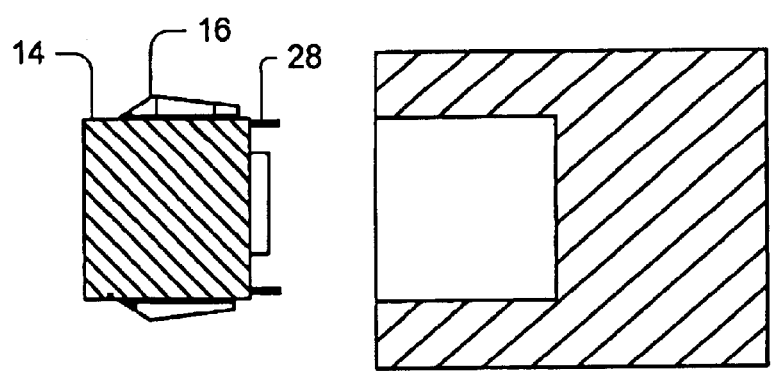

FIGS. 7a–c show a process by way of which the cartridge 14 is slid from the carrier 16 through port 20 in order to be removed from the magazine. Referring first to FIG. 7a, the cartridge 14 is initially in its latched position in the carrier 16. The grippers 28 in their starting position are between the carrier 16 and the drive 10 with the gripper 28 opened. As illustrated in FIG. 7b, the grippers 28 are moved into their closed position in which they have a lesser spacing than the width of the cartridge 14. Then, as illustrated in FIG. 7c, the gripper system now moves the grippers 28 toward the carrier 16 wherein the grippers 28 engage the front edge of cartridge 14 and slide it, while overcoming the latching, out of the carrier 16 through the port 20 (not shown in FIGS. 7a–c) such that the cartridge 14 can be grasped by the user and can be pulled out completely.

While particular embodiments of the present invention have been disclosed, it is to be understood that various different modifications and combinations are possible and are contemplated within the true spirit and scope of the appended claims. There is no intention, therefore, of limitations to the exact abstract or disclosure herein presented.

| LIST OF REFERENCE SYMBOLS | |
|---|---|
| 10 | Drive |
| 12 | Cartridge pocket |
| 14 | Cartridge |
| 16 | Carrier |
| 18 | Housing |
| 20 | Port |
| 22 | Bottom |
| 24 | Guidance walls |
| 26 | Slide rails |
| 28 | Gripper |
| 30 | Sliding bars |
| 32 | Toothings |
| 34 | Pinion gear |
| 36 | Electric motor |
| 38 | Guidances |
| 40 | Electric motor |
| 42 | Gearing |
| 44 | Driving pinion |
| 46 | Toothed rack |
| 48 | Flap of cartridge |

What is claimed is:

1. A library for cartridges of a data storage tape, comprising:
   at least one drive comprising a cartridge pocket;
   a magazine comprising one or more receivers for holding the cartridges, said receivers being selectively positionable in front of the cartridge pocket in order to transfer a cartridge between the receiver and the cartridge pocket; and
   and a housing having a port through which cartridges can be inserted into the magazine and removed from the magazine,
   wherein the cartridge pocket of at least one drive, a receiver positioned in front of the cartridge pocket, and the port are disposed aligned with one another such that a cartridge can be directly transported linearly through the port and the receiver into the cartridge pocket or can be transported from the cartridge pocket through the receiver and the port.

2. The library as claimed in claim 1, wherein the receivers in the magazine revolve on a closed path of revolution about the at least one drive.

3. The library as claimed in claim 2, wherein cartridges in the cartridge pocket and in the receivers are disposed with a flat side in a common plane, said common plane being substantially parallel to a plane of the revolution of the magazine.

4. The library as claimed in claim 1, further comprising a gripper system for transporting the cartridge between a receiver and a cartridge pocket and between a receiver and the port, said gripper system including a pair of grippers, said grippers being adapted to selectively grasp and release a cartridge, said gripper system being linearly movable in a direction of transport of the cartridge, and said grippers being opposingly movable transversely to said direction of transport.

5. The library as claimed in claim 4, wherein said gripper system is adapted to transport cartridges in one or more transport moves, said grippers regrasping said cartridge during each of said moves.

6. The library as claimed in claim 4, wherein said grippers are adapted to engage a cartridge in front or behind said cartridge in order to push said cartridge into said cartridge pocket or through said port.

7. A method of inserting a cartridge into a cartridge pocket in a library for cartridges of a data storage tape, comprising:

providing a cartridge pocket of a drive in alignment with a port in a housing of a library;

aligning a carrier with said cartridge pocket and said port along a transport axis;

inserting a cartridge at least partially through said port;

engaging opposing sides of said cartridge with a pair of grippers provided within said housing;

driving said pair of grippers in a direction away from said port along said transport axis, thereby sliding said cartridge toward said cartridge pocket; and disengaging said grippers from said cartridge.

8. The method according to claim 7, further comprising:

engaging a rear end of said cartridge with said pair of grippers; and driving said pair of grippers along said transport axis, thereby forcing said cartridge into said cartridge pocket.

9. A method of removing a cartridge from a cartridge pocket in a library for cartridges of a data storage tape, comprising:

providing a cartridge pocket of a drive in alignment with a port in a housing of a library;

aligning a carrier with said cartridge pocket and said port along a transport axis;

ejecting a cartridge from said cartridge pocket along said transport axis, whereby at least a portion of said cartridge is located outside of said cartridge pocket;

engaging opposing sides of said cartridge with a pair of grippers;

driving said pair of grippers in a direction away from said cartridge pocket along said transport axis, thereby sliding said cartridge at least partially out of said cartridge pocket; and disengaging said grippers from said cartridge.

10. The method according to claim 9, further comprising:

engaging a front end of said cartridge with said pair of grippers; and driving said pair of grippers along said transport axis, thereby forcing said cartridge onto said carrier.

* * * * *